United States Patent
Luck et al.

(10) Patent No.: US 11,148,220 B2
(45) Date of Patent: *Oct. 19, 2021

(54) METHOD AND APPARATUS FOR WIRELESS REMOTE CONTROL COMMUNICATION OF A WELDER

(71) Applicant: ILLINOIS TOOL WORKS INC., Glenview, IL (US)

(72) Inventors: John Alan Luck, Appleton, WI (US); Stephen Paul Ferkel, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 920 days.

This patent is subject to a terminal disclaimer.

(21) Appl. No.: 14/886,533

(22) Filed: Oct. 19, 2015

(65) Prior Publication Data

US 2016/0039035 A1 Feb. 11, 2016

Related U.S. Application Data

(63) Continuation of application No. 11/560,765, filed on Nov. 16, 2006, now Pat. No. 9,180,544.

(51) Int. Cl.
*B23K 9/10* (2006.01)

(52) U.S. Cl.
CPC .......... *B23K 9/1087* (2013.01); *B23K 9/1062* (2013.01)

(58) Field of Classification Search
CPC ...... B23K 9/10; B23K 9/1062; B23K 9/1087; B23K 9/1006; B23K 31/00

(Continued)

(56) References Cited

U.S. PATENT DOCUMENTS

| 2,043,331 A | 6/1936 | Notvest |
| 2,175,891 A | 10/1939 | Graham |

(Continued)

FOREIGN PATENT DOCUMENTS

| CN | 1538306 | 10/2004 |
| CN | 1746833 | 3/2006 |

(Continued)

OTHER PUBLICATIONS

American Welding Society, "Welding Journal, Special Emphasis: Computer Technology in Welding," vol. 79, No. 1, https://app.aws.org/wj/2000/01/WJ_2000_01.pdf, Jan. 2000.

(Continued)

*Primary Examiner* — Robert J Utama
*Assistant Examiner* — Ayub A Maye
(74) *Attorney, Agent, or Firm* — McAndrews, Held & Malloy, Ltd.

(57) ABSTRACT

A method and apparatus of communicating control signals to a welding power source from a remote location includes a welding system operated by control signals transmitted by a wireless remote control that can be remotely located from the welding power source. A plurality of welding parameters in the welding system are set and adjusted in response to wireless command signals transmitted to a receiver that is connected to the welding power source via a connection port and is further connected to a controller in the welding power source. In this regard, an operator is able to quickly and efficiently control a welding system from a remote location, with no more cables than are necessary to perform the intended task.

10 Claims, 2 Drawing Sheets

(58) Field of Classification Search
USPC .............. 219/130.1, 132, 136, 130.5, 130.51
See application file for complete search history.

(56) References Cited

U.S. PATENT DOCUMENTS

| | | | |
|---|---|---|---|
| 2,526,597 | A | 10/1950 | Winslow |
| 2,617,913 | A | 11/1952 | Oestreicher |
| 2,642,515 | A | 6/1953 | Bagg |
| 3,567,902 | A | 3/1971 | Stearns |
| 3,992,565 | A | 11/1976 | Gatfield |
| 4,051,344 | A | 9/1977 | Robbins |
| 4,079,231 | A | 3/1978 | Toth |
| 4,147,919 | A | 4/1979 | Matasovic |
| 4,216,367 | A | 8/1980 | Risberg |
| 4,216,368 | A | 8/1980 | Delay |
| 4,227,066 | A | 10/1980 | Bulwidas |
| 4,247,752 | A | 1/1981 | Stringer |
| 4,266,114 | A | 5/1981 | Hansen |
| 4,410,789 | A | 10/1983 | Story |
| 4,450,340 | A | 5/1984 | Corrigall |
| 4,467,174 | A | 8/1984 | Gilliland |
| 4,508,954 | A | 4/1985 | Kroll |
| 4,521,672 | A | 6/1985 | Fronius |
| 4,531,045 | A | 7/1985 | Kemp |
| 4,561,059 | A | 12/1985 | Davis |
| 4,641,292 | A | 2/1987 | Tunnell |
| 4,767,908 | A | 8/1988 | Dallavalle |
| 5,039,835 | A | 8/1991 | Schwiete |
| 5,043,557 | A | 8/1991 | Tabata |
| 5,276,305 | A | 1/1994 | Hsien |
| 5,406,050 | A | 4/1995 | Macomber |
| 5,708,253 | A * | 1/1998 | Bloch ................. B23K 9/0953 219/130.01 |
| 6,040,555 | A | 3/2000 | Tiller |
| 6,103,994 | A | 8/2000 | DeCoster |
| 6,156,999 | A | 12/2000 | Ignatchenko |
| 6,423,936 | B1 | 7/2002 | Reed |
| 6,504,131 | B1 * | 1/2003 | Hayes ................. B23K 9/0953 219/130.01 |
| 6,512,199 | B1 | 1/2003 | Blazina |
| 6,531,673 | B2 | 3/2003 | Fedorcak |
| 6,570,132 | B1 | 5/2003 | Brunner |
| 6,624,388 | B1 | 9/2003 | Blankenship |
| 6,781,095 | B2 | 8/2004 | Hayes |
| 6,841,752 | B2 | 1/2005 | Ward |
| 6,906,285 | B2 | 6/2005 | Zucker |
| 6,909,285 | B2 | 6/2005 | Jordan |
| 7,045,742 | B2 | 5/2006 | Feichtinger |
| 7,205,503 | B2 | 4/2007 | Reynolds |
| 7,245,875 | B2 | 7/2007 | Clark |
| 7,336,259 | B2 | 2/2008 | Li |
| 7,381,922 | B2 | 6/2008 | Ulrich |
| 2003/0184515 | A1 | 10/2003 | Tsai |
| 2004/0026392 | A1 | 2/2004 | Feichtinger |
| 2005/0155068 | A1 | 7/2005 | Chang |
| 2005/0199605 | A1 | 9/2005 | Furman |
| 2006/0163227 | A1 | 7/2006 | Hillen |

FOREIGN PATENT DOCUMENTS

| | | |
|---|---|---|
| EP | 0575082 | 12/1993 |
| EP | 1112800 | 7/2001 |
| EP | 1500456 | 1/2005 |
| EP | 1683599 | 7/2006 |
| JP | 61137675 | 6/1986 |
| JP | 04162964 | 6/1992 |
| JP | 04162966 | 6/1992 |
| JP | 2003088957 | 3/2003 |
| JP | 2003154455 | 5/2003 |
| JP | 2003191075 | 7/2003 |
| JP | 2003236663 | 8/2003 |
| WO | 0134337 | 5/2001 |
| WO | 02085566 | 10/2002 |

OTHER PUBLICATIONS

D-Link, "D-Link AirPlus G DWL-G730AP," http://www.dlink.com/-/media/Consumer_Products/DWL/DWL%20G730AP/Manual/DWLG730AP_Manual_EN_UK.pdf, Aug. 10, 2004.

Scientific Atlanta, "WebSTAR Model DPW941 Wireless Ethernet Adapter," http://www.cisco.com/web/consumer/support/userguides2/738183.pdf, Apr. 2005.

"Miller PC-300 Owner's Manual", Aug. 1989 (Aug. 1989), http://igor.chudov.com/manuals/Miller/Miller-PC-300-Pulse-Control_Manual.pdf.

Avocent, "LongView Wireless User Guide", 2005, http://site.i-techcompany.com/DataSheet/Avocent/lv5800UG.pdf.

Echelon, "PL 3120/PL 3150 Power Line Smart Transceiver Data Book," Version 2, 005-0154-01C.

Hackl et al., "Digitally Controlled GMA Power Sources," Fronius, www.fronius.com/worldwide/usa/products/paper_digitally_controlld_power_sources_gb.pdf, pp. 1-7, publication date not provided.

Intellon, "CEBus Power Line Encoding and Signaling," White Paper #0027, Mar. 1997, Version 0.1, pp. 1-6.

Wireless Universal Serial Bus Specification, Revision 1.0, May 12, 2005.

\* cited by examiner

METHOD AND APPARATUS FOR WIRELESS REMOTE CONTROL COMMUNICATION OF A WELDER

CROSS REFERENCE TO RELATED APPLICATION

This application is a Continuation Application of U.S. patent application Ser. No. 14/560,765, entitled "Method and Apparatus for Wireless Remote Control Communication of a Welder", filed Nov. 16, 2006, which is hereby incorporated by reference in its entirety.

BACKGROUND OF THE INVENTION

The present invention relates generally to welding machines and, more particularly, to a method and apparatus of communicating control signals to a welding power source from a remote location. Specifically, the invention relates to a welding system whose operation is governed by control signals transmitted by a wireless remote control. A plurality of welding parameters in the welding system are set and adjusted in response to wireless command signals received by the welding power source. In this regard, an operator is able to quickly and efficiently control a welding system from a remote location, with no more cables than are necessary for welding.

Welding and cutting are essential operations in many different areas of manufacturing and construction in today's economy. The versatility and efficiency of welding and cutting systems is vital to, and allows for, the efficient completion of many complex and dynamic welding operations. In many welding and cutting processes performed by operators, welding-type systems are adjusted during the process to accommodate several different welding-type operations. When the need for such adjustments arise, the welding parameters in the welding-type system need to be properly set for each different welding-type process. In each of these processes, parameters need to be set and adjusted prior to and during the welding-type process. In many instances, the welding-type process takes place at a distance from the actual welding machine/power source. Thus, an operator is required to walk back to the machine to make any necessary adjustments. To overcome this problem, some welding-type systems have started to incorporate some form of remote control. In many existing systems, power and communications between an operator location and a welding-type power source location are transmitted over cables. These cables provide a simple and reliable means for communication and control of various welding parameters.

Despite the benefits of such a set-up, there are also numerous drawbacks associated with communication and control of the welding-type system in such a manner. One drawback to this cable-based control is that the communications cable is typically fragile relative to the welding cables designed to carry high currents at high voltages. Welding-type systems are often used at sites where it is not uncommon for the systems to be periodically relocated or surrounded by other mobile heavy equipment operating in the same area. As such, the remote control communications cable can become damaged by being crushed or snagged from contact with surrounding machines and/or traffic. This can cause damage to the welding-type power source if internal power conductors become shorted to signal leads that are connected to sensitive signal level circuitry and obviously reduce productivity.

Communications cables for remote control of a welding device also produce additional concerns. One of these concerns is the introduction of high frequency electrical noise to the welding-type system, which occurs because of the high voltages present in the environment surrounding the communications cable. The communications cable provides a conduit for the noise to enter the power source and controller of the welding-type system. This noise and interference must be filtered out so as not to negatively affect the performance of the system.

Because of the numerous drawbacks associated with communication cables for remote control of a welding-type system, attempts have been to modify the manner of communication in newer systems. Various types of remote control devices have been introduced to facilitate operator control of the welding-type processes thru a means other than just a standard communications cable. However, while newly designed systems can be designed to include such wireless remote control devices, a problem persists regarding existing welding systems not currently configured to allow for operation via a wireless remote control. Therefore, a need remains for a system able to retrofit an existing welder with a remote device capable of controlling a welding operation in a manner that is practical and efficient for an operator.

A remote control device that can be incorporated into existing welding systems and that can wirelessly control a plurality of welding processes is a feature that would greatly enhance the productivity of existing welding systems. Eliminating the communications cord with a wireless remote control would overcome many of the problems associated with high frequency electrical noise as described above. A wireless remote control would also provide for many benefits and conveniences for an operator, such as reducing the inconvenience of extra cables. Removal of a communication cord also would eliminate the possibility of communications being damaged due to sparks, hot metal and heavy objects falling on the cord and increase portability of a welding system. The elimination of extra cords also would allow for more convenient use of the welding system in confined areas.

BRIEF DESCRIPTION OF THE INVENTION

The present invention overcomes the aforementioned drawbacks and adds the stated benefits by providing a welding-type system capable of wirelessly controlling various welding parameters from a remote location. The welding-type system includes a welding power source having a controller, a welding torch, a wireless remote control capable of controlling a plurality of parameters in a welding system, and a receiver.

Therefore, in accordance with one aspect of the present invention, a welding-type system is disclosed that includes a power source having a controller to regulate welding operations and a welding torch connected to the power source. The system also includes a wireless remote control configured to remotely transmit a signal for controlling a plurality of welding parameters in the welding system, and a receiver remote from the wireless control and configured to receive the signal and allow the controller to regulate at least one of the plurality of welding parameters in response thereto. The receiver is further configured to engage a connection port located on the power source, the connection port configured to engage both the receiver and a control cable.

In accordance with a further aspect of the present invention, a wireless remote control kit for retrofitting a welding-type apparatus is provided. The wireless remote control kit includes a wireless control configured to transmit a signal to control a plurality of welding parameters in a welding-type apparatus suitable for producing a welding-type power. The wireless remote control kit further includes a receiver remote from the wireless control and configured to receive and relay the signal to the welding-type apparatus. The receiver is operatively connected to a controller housed in a power source of the welding-type apparatus.

According to yet a further aspect of the invention, a method for adapting an existing welding-type system for use with a wireless remote control is disclosed. The method includes the steps of connecting a receiver to a welding-type power source by way of an existing control cable connection port, wirelessly transmitting a signal from the wireless remote control indicative of desired operational parameters of the welding-type system, receiving the signal remotely by way of the receiver, and controlling the welding-type system in accordance with data embodied in the received wirelessly transmitted signal.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
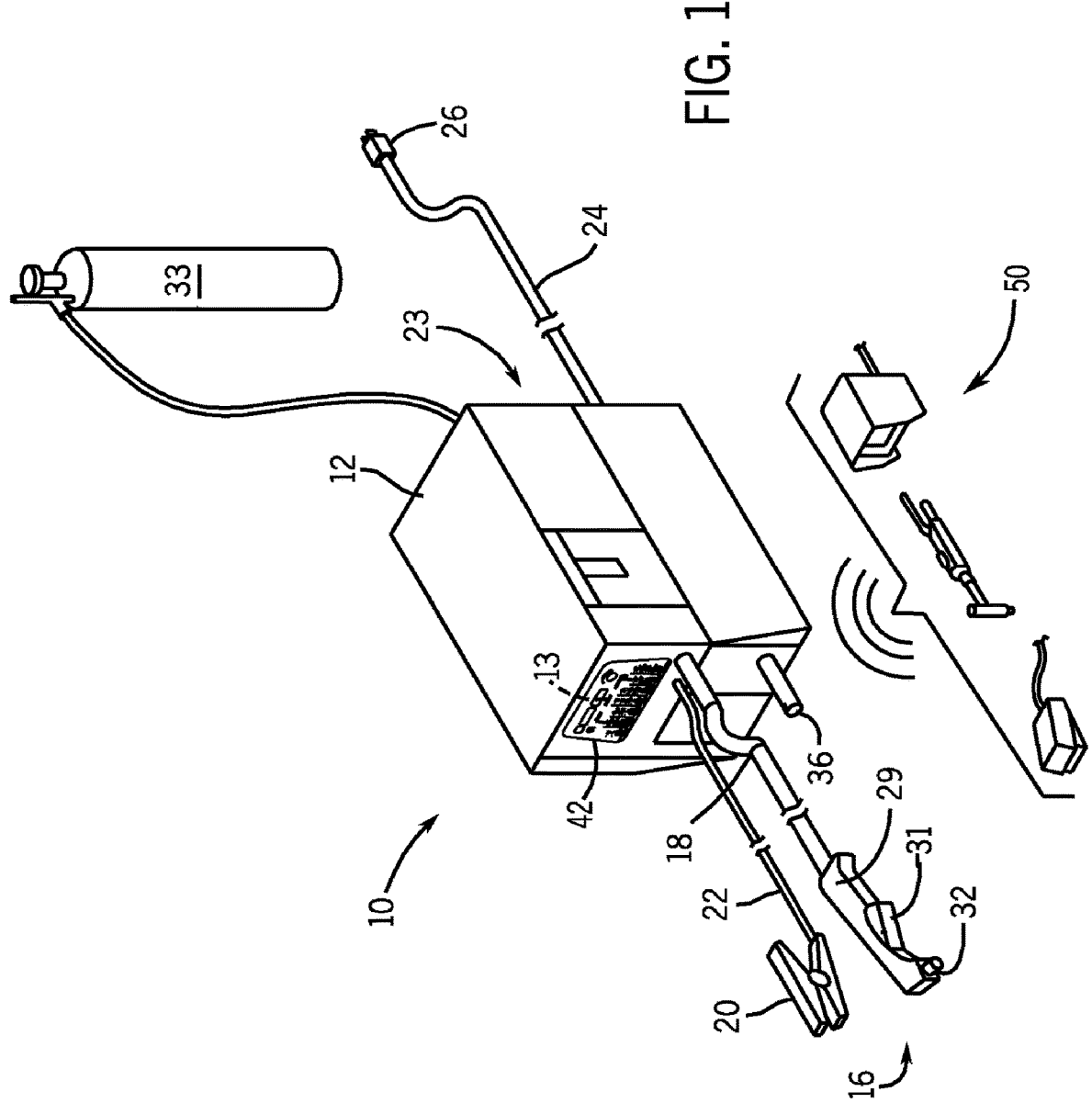
FIG. 1 is a perspective view of a welding-type system and remote control communication system for controlling a welding-type device according to the present invention.
Figure 2:
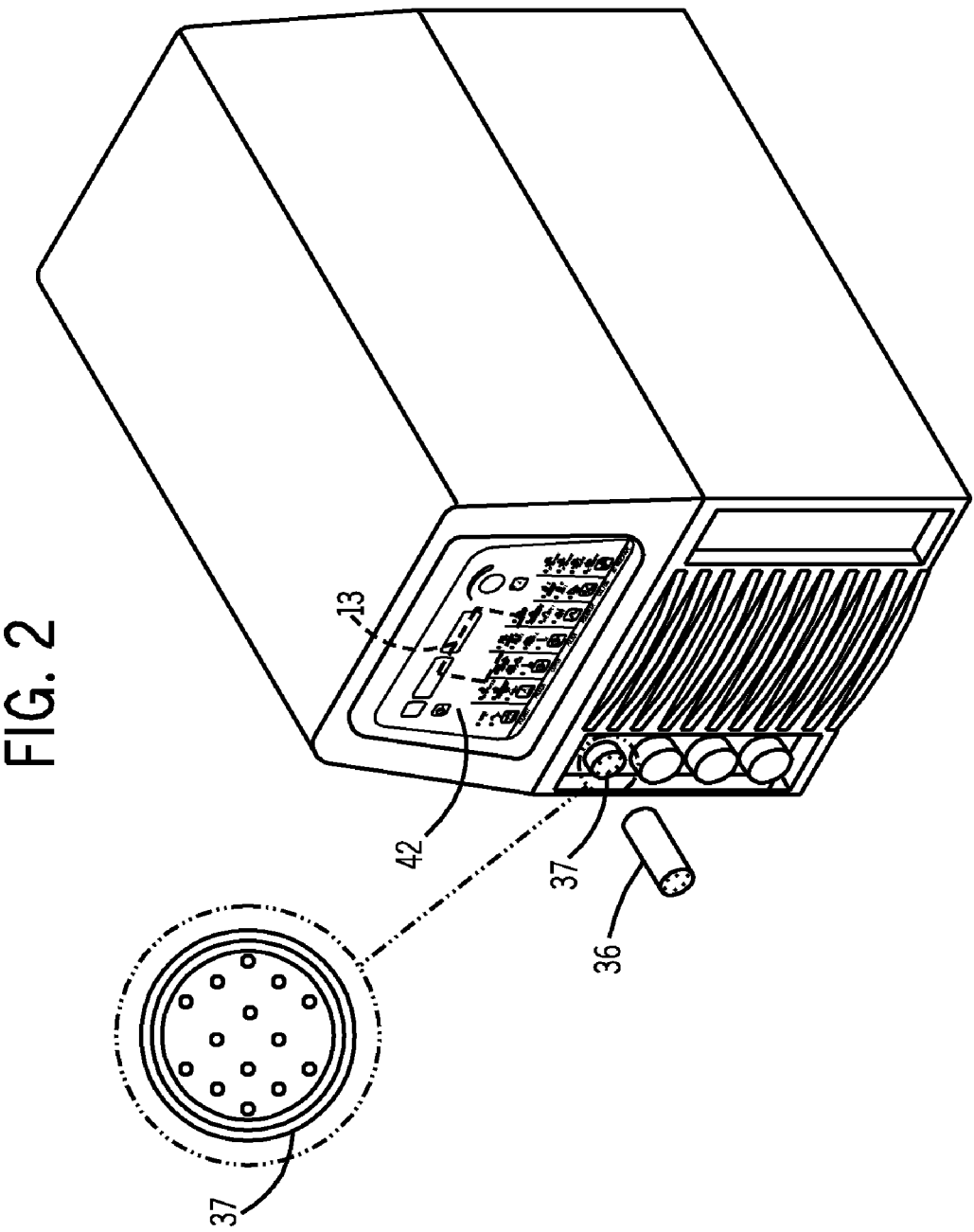
FIG. 2 is a perspective view of the welding-type system of FIG. 1 and a detailed view of a connection port thereon.

FIG. 1 shows a welding-type system capable of performing various types of operations. The welding-type system 10 is merely representative of a wide variety of welding-type machines having various sizes, features, and ratings. The welding-type system, as contemplated herein, can be configured to not only perform standard welding type operations such as TIG, MIG, and/or stick welding, but can also be capable of performing various cutting operations that are closely associated with the various welding procedures, such as plasma cutting for example. In the exemplary embodiment of FIG. 1, the welding-type system shown is preferably a tungsten inert gas (TIG) welding system, however, one skilled in the art will readily appreciate that it may be any related welding or cutting system, including those listed above. TIG welding system 10 includes a power source 12 to condition raw power and generate a power signal suitable for welding applications. Power source 12 includes a processor/controller 13 that receives operational feedback and monitors the operation of TIG welding system 10. Connected to power source 12 is a torch 16 via a cable 18. Cable 18 provides torch 16 with power and compressed air or gas, where needed. Torch 16 includes a handle portion 29, or torch body, having a trigger 31 thereon to actuate the torch and work tip 32 extending therefrom.

Also connected to power source 12 is a work clamp 20 which is designed to connect to a workpiece (not shown) to be welded and provide a return path. Connecting work clamp 20 to power source 12 is a cable 22 designed to provide the return path for the welding current from torch 16 through the workpiece and work clamp 20. Extending from a rear portion 23 of power source 12 is a power cable 24 having a plug 26 for connecting power source 12 to either a portable power supply (not shown) or a transmission line power receptacle (not shown). Also connected to the power source is a gas source 33 configured to supply a gas flow to the welding torch 16.

To allow for wireless operation of the welding-type system 10 from a location remote from power source 12, wireless remote control 50 and receiver 36 are included in welding-type system 10 and configured to set and adjust operational parameters therein. Wireless remote control 50 is located remote from the welding-type power source 12 during a welding-type operation and communicates with receiver 36. Receiver 36 is operatively connected to controller 13 and welding-type power source 12 and is configured to receive and relay wireless signals from control 50 to controller 13 to process the received wireless data. In this manner, wireless remote control 50 controls operation of the welding-type system 10 and sets or adjusts the various welding-type parameters.

As shown in FIG. 1, receiver 36 is specially constructed to interconnect to an existing connection port 37 of welding-type system 10. In addition to interconnecting with receiver 36, connection port 37 is also configured to engage standard control cables (not shown) often used in a welding system. As receiver 36 is constructed to engage connection port 37, older welding-type systems not capable of control via a wireless remote device can be easily modified (i.e., retrofitted) to incorporate receiver 36 and wireless remote control 50 of the current invention. In one embodiment of the current invention, receiver 36 can be constructed to connect to welding-type power source 12 by way of an existing 14-pin connection port 37 located on the front panel 42 of power source 12. Preferably, receiver 36 is operable with either AC or DC power, and over various control voltages, at least ranging from 5V to 24V. An exemplary control circuit having a wide voltage window is preferred to achieve this functionality.

Various means of communication can be used to transmit signals from wireless remote 50 to receiver 36. In a preferred embodiment, radio control (RC) signals are used. However, other means of communication can include, but are not limited to, radio frequency (RF), cellular digital packet data, high speed circuit switched data, packet data cellular, general packet radio service, radio transmission technology, Bluetooth, IrDA, multi-channel multipoint distribution service, local multipoint distribution service, WiMAX, 802.11 Wi-Fi, infrared, UHF, VHF, and RIM. It is recognized that the mode of communication selected will depend on the specific needs of the welding-type process and on the environment in which the process is being performed in.

As shown in FIG. 1, it is envisioned that wireless remote control 50 be in the form of a foot pedal control, a handheld control, or a fingertip control; however, such embodiments are not meant to limit the form of the wireless remote control 50 that can be used in the present invention. A wireless remote control 50 in the form of a foot pedal control, fingertip control, or handheld control, can include a switch (not shown) or other similar device thereon that allows an operator to easily adjust and control one or more welding parameters in welding-type system 10. These controllable welding parameters can include, but are not limited to, current, voltage, inductance, and pulse commands.

The specific welding parameter that is controlled by wireless remote control 50 is determined by an operator via a front panel control 42 on power source 12. Front panel control 42 is of a design well-known in the art, and includes a plurality of adjustors and selectors thereon. The exact mechanisms found on front panel control 42 can vary, but will allow an operator to select the specific welding parameters to be controlled by wireless remote control 50.

As stated above, not only can a welding-type system 10 be designed with the wireless remote control 50 and receiver 36, but it is also envisioned that existing welding-type systems can be modified with an assembly kit, to allow for wireless remote control of the system. A wireless remote control assembly kit (not shown) can be integrated with an existing welding-type system by operatively connecting receiver 36 with controller 13 of the welding-type power source 12 via an existing connection port 37. Wireless remote 50 is then configured to communicate with receiver 36. Receiver 36 is configured to receive and relay wireless signals from control 50 to the controller 13 to process the received wireless data so as to control operation of the welding-type system 10 and set or adjust the various welding-type parameters.

As one skilled in the art will readily appreciate, the aforementioned description of welding-type systems not only includes welders, but also includes any system that requires such enclosures and/or high power outputs, such as heating and cutting systems. Those skilled in the art are well acquainted with such welding-type devices, and as used herein, the term is given its ordinary meaning to those skilled in the art of welding and cutting apparatus.

Therefore, the present invention, including welding-type systems, is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting, or any similar systems.

Therefore, in accordance with one embodiment of the present invention, a welding-type system is disclosed. The welding-type system includes a power source having a controller to regulate welding operations and a welding torch actuated by a trigger and connected to the power source. The system also includes a wireless remote control configured to remotely transmit a signal for controlling a plurality of welding parameters in the welding system, and a receiver remote from the wireless control and configured to receive the signal and allow the controller to regulate at least one of the plurality of welding parameters in response thereto. The receiver is further configured to engage a connection port located on the power source, the connection port configured to engage both the receiver and a control cable.

According to another embodiment of the present invention, a wireless remote control kit for retrofitting a welding-type apparatus is provided. The wireless remote control kit includes a wireless control configured to transmit a signal to control a plurality of welding parameters in a welding-type apparatus suitable for producing a welding-type power. The wireless remote control kit further includes a receiver remote from the wireless control and configured to receive and relay the signal to the welding-type apparatus. The receiver is operatively connected to a controller housed in a power source of the welding-type apparatus.

According to a further embodiment of the invention, a method for adapting an existing welding-type system for use with a wireless remote control is disclosed. The method includes the steps of connecting a receiver to a welding-type power source by way of an existing control cable connection port, wirelessly transmitting a signal from the wireless remote control indicative of desired operational parameters of the welding-type system, receiving the signal remotely by way of the receiver, and controlling the welding-type system in accordance with data embodied in the received wirelessly transmitted signal.

The present invention has been described in the terms of the preferred embodiment and it is recognized that equivalents, alternatives, and modifications, aside from those expressly stated, are possible and within the scope of the appending claims.

What is claimed is:

1. A welding, cutting, or heating system comprising:
   a welding, cutting, or heating power source having a controller to regulate welding operation;
   a wireless remote control configured to remotely transmit a signal for controlling at least one of a current command, a voltage command, an inductance parameter, or a pulse command in the welding, cutting, or heating system, wherein the wireless remote control is one of a handheld control, a footpedal control, and a fingertip control; and
   a wireless receiver connected to the controller remote from the wireless remote control and configured to receive the signal and relay the signal to the controller to regulate the at least one of the current command, the voltage command, the inductance parameter, or the pulse command in response to the signal, wherein the wireless receiver is configured to engage an existing welding, cutting, or heating 14-pin control cable connection port located on an exterior of the welding, cutting, or heating power source, the existing 14-pin control cable connection port being usable to connect a welding, cutting, or heating control cable.

2. The welding, cutting, or heating system of claim 1, wherein the wireless receiver is operatively connected to the welding, cutting, or heating power source and the controller to relay signals therebetween.

3. The welding, cutting, or heating system of claim 1, wherein the wireless remote control communicates with the wireless receiver via one of a radio control (RC), radio frequency (RF), cellular digital packet data, high speed circuit switched data, packet data cellular, general packet radio service, radio transmission technology, Bluetooth, IrDA, multichannel multipoint distribution service, local multipoint distribution service, WiMAX, 802.11 Wi-Fi, infrared, UHF, VHF, and RIM.

4. The welding, cutting, or heating system of claim 1, wherein the existing welding, cutting, or heating control cable connection port is configured to engage, at different respective times, both the welding, cutting, or heating control cable and the wireless receiver via matching male and female connectors.

5. A wireless remote control kit comprising:
   a wireless control configured to transmit a signal to control at least one of a current command, a voltage command, an inductance parameter, or a pulse command in a welding, cutting, or heating apparatus suitable for producing a welding, cutting, or heating power, wherein the wireless remote control is one of a handheld control, a footpedal control, and a fingertip control; and a wireless receiver remote from the wireless control and configured to receive and relay the signal to the welding, cutting, or heating apparatus, wherein the wireless receiver is configured to be operatively connected to a controller housed in a welding, cutting, or heating power source of the welding, cutting, or heating apparatus by connection to an existing welding, cutting, or heating 14-pin control cable connection port located on an exterior of the welding-type power source, wherein the existing welding, cutting, or heating 14-pin control cable connection port is usable to connect a welding, cutting, or heating control cable.

6. The wireless remote control kit of claim 5, wherein the wireless control communicated with the wireless receiver via one of a radio control (RC), radio frequency (RF), cellular digital packet data, high speed circuit switched data, packet data cellular, general packet radio service, radio transmission technology, Bluetooth, IrDA, multi-channel multipoint distribution service, local multipoint distribution service, WiMAX, 802.11 Wi-Fi, infrared, UHF, NHF, and RIM.

7. The wireless remote control kit of claim 5, wherein the existing welding control cable connection port is configured to engage, at different respective times, both the welding control cable and the wireless receiver via matching male and female connectors.

8. A method comprising:
connecting a wireless receiver to a welding power source by way of an existing welding 14-pin control cable connection port located on an exterior of the welding power source, the existing welding 14-pin control cable connection port being usable to connect a welding control cable;
wirelessly transmitting a signal from a wireless remote control, wherein the wireless remote control is one of a handheld control, a footpedal control, and a fingertip control, and the signal is indicative of at least one of a current command, a voltage command, an inductance parameter, or a pulse command of the welding-type power source;
receiving the signal remotely by way of the wireless receiver; and
controlling the welding power source in accordance with the at least one of the current command, the voltage command, the inductance parameter, or the pulse command embodied in the received wirelessly transmitted signal.

9. The method of claim 8, wherein the step of wirelessly transmitting the signal includes the step of wirelessly transmitting the signal via one of a radio control (RC), radio frequency (RF), cellular digital packet data, high speed circuit switched data, packet data cellular, general packet radio service, radio transmission technology, Bluetooth, IrDA, multichannel multipoint distribution service, local multipoint distribution service, WiMAX, 802.11 Wi-Fi, infrared, UHF, VHF, and RIM.

10. The method of claim 8, wherein the existing welding control cable connection port is configured to engage, at different respective times, both the welding control cable and the wireless receiver via matching male and female connectors.

* * * * *